(No Model.)
C. QUAST.
CLUTCH.
No. 571,396. Patented Nov. 17, 1896.
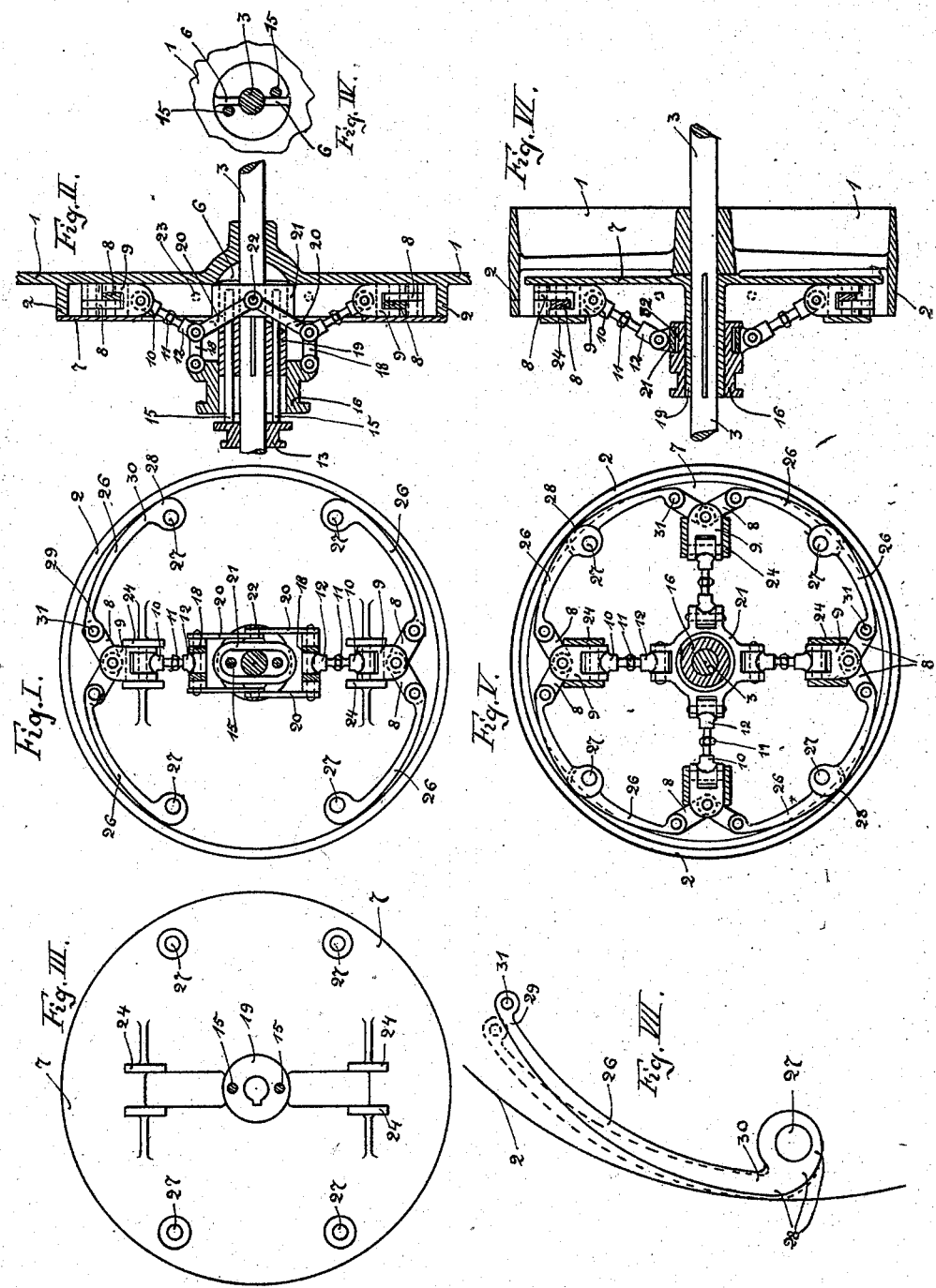
Witnesses:
E. F. Quast.
J. M. Spear
Inventor.
Chas. Quast.
THE NORRIS PETERS CO., PHOTO-LITHO., WASHINGTON, D. C.

UNITED STATES PATENT OFFICE.

CHARLES QUAST, OF BUCYRUS, OHIO.

CLUTCH.

SPECIFICATION forming part of Letters Patent No. 571,396, dated November 17, 1896.

Application filed December 31, 1894. Serial No. 533,447. (No model.)

*To all whom it may concern:*

Be it known that I, CHARLES QUAST, a citizen of the United States, residing at Bucyrus, in the county of Crawford and State of Ohio, have invented certain new and useful Improvements in Clutches, of which the following is a specification, reference being had therein to the accompanying drawings.

The invention includes eccentric shoes arranged to engage the clutch-shell and having spring-arms connected to toggle-lever mechanism, whereby the arms will yield after the shoes are set. It includes equalizing devices and locking means, as will be hereinafter described.

Figure 1 is a front view of the clutch with the cover 7 removed. Fig. 2 is a vertical section through the clutch. Fig. 3 shows the transmitting plate or cover. Fig. 4 shows locking arrangement. Fig. 5 shows front view of clutch with more than two sets of shoes. Fig. 6 shows section of clutch with single toggle. Fig. 7 shows clutch-shoe.

The disk 1 carries the friction-rim 2 and is loose on the shaft 3. The clutch-cover 7 is keyed on shaft 3 and carries by pins 27 clutch-shoes 26. The shifting sleeve 16 slides on hub 19 of clutch-cover 7 and connects through links 18 with toggle-joints 20, 12, 11, and 10. The toggle-levers 20 are supported by pins 22 of loose collar 21. Toggle-levers, composed of parts 10, 11, and 12, connect at one end with sliding shoes 9, which slide in guides 24 and which connect with toggle-levers 8. These toggle-levers connect by pin 31 with the free end of the clutch-shoes 26 and serve as transmitting-toggles to transmit the power to the shoes. The friction-shoes have an eccentric portion 28, a thin portion at 29, and a thicker portion at 30.

Collar 13 slides on shaft 3 and carries pins 15, which bear in hub 19 and extend through a centrically-movable collar 21. Disk 1 has near the hub a recess and ribs 6 in same. The two main toggle-levers 20 are pivotally connected to the collar 21.

As shown in Figs. 5 and 6, the centrically-movable collar 21 may be placed on the shifting sleeve 16, and in place of carrying two pairs of double-toggle levers may carry two or more single-toggle levers. The space 32 between collar 21 and sliding sleeve 16 allows said collar to move centrically in either direction.

The operation is as follows: By shoving the sliding sleeve 16 toward the friction-rim the main toggles will straighten and by means of supplemental toggles 8 will spread the loose ends of the friction-shoes. After the main toggles are straightened sliding collar 13 is shoved inward until it comes against sliding sleeve 16. This brings rods 15 to enter the recess near the hub in disk 1. If the clutch should fail to transmit its full speed to the friction-rim, the slipping will cause ribs 6 to come in contact with pins 15 and thus lock the clutch. In disengaging the clutch the sliding sleeve 16 is pulled outward, and with it will move the sliding collar 13 and pins 15. Pins 15 are released from ribs 6 before the friction-shoes leave the friction-rim, i. e., the movement of sliding sleeve 16 will pull sliding sleeve 13 and pins 15 back sufficiently to release ribs 6 before the friction-shoes have diminished their pressure upon the friction-rim. In throwing in the clutch the eccentrical portion 28 of friction-shoes 26 will touch the friction-rim first, and by continual gradual inward moving of sliding sleeve 16 the shoe will come more and more in contact with the rim and be bent to suit the radius of the friction-rim. The space between the shaft and the centrically-movable collar which connects and supports the toggle-levers is to allow an automatically equalizing of pressure upon all the friction-shoes used in one clutch. In setting up the clutch turnbuckle 11 is screwed in right-and-left knuckles 10 and 12, thus spreading the knuckles. The amount of setting up is partially transmitted to the opposite shoes. The loose collar 21 may be carried either around the shaft, as shown in Figs. 1 and 2, or around the shifting sleeve 16, as shown in Figs. 5 and 6. It will be seen that the toggle can spread the friction-shoes considerably more even after the eccentrical portion has touched the friction-rim, thus allowing a reserve amount of movement of the loose end of the friction-shoes even after the shoes are transmitting their full motion to the rim or the rim to the shoes, so that in case the shoes wear there still remains enough movement to provide for more wear and still transmit the speed. The shoes in this clutch are used as an elastic intermediate to prevent sudden shock in engaging and disengaging the clutch and also in facilitating a larger movement of the free ends of the shoes and in facilitating movement of the free ends of the shoes after the fixed ends of the portion next to the eccentrical portions of the shoes are in contact with the rim. After the eccentrical portions of the shoes are in contact with the friction-rim the friction caused by this contact will have a tendency to slip the eccentrical portion around its fixed point, and as the distance between the eccentrical portion and the center of swivel increases toward the friction-rim said eccentric cannot be turned around its fulcrum in that direction, and consequently the pressure and the friction between the friction-rim and the eccentrical portion will be so great that the driving part will carry the driven part at equal speeds.

I claim—

1. In combination, the shaft, the clutch-shell, the clutch-shoes arranged at opposite points of the shell, the toggle-levers extending substantially radially of the shell, and the collar 21 connected thereto, with means for operating the parts, said collar being arranged to move radially of the shell in the direction of the toggles, substantially as described.

2. In combination the clutch-shell, the clutch-shoes, the double toggles for operating the same, the shifting sleeve connected to the central joint of the double-toggle levers and the collar 21 to which the inner ends of the double toggles are connected, said collar 21 being movable radially of the shell substantially as described.

In testimony whereof I affix my signature in presence of two witnesses.

CHARLES QUAST.

Witnesses:
A. J. YAWYER,
GEO. F. CULLY.